(12) United States Patent
Tran et al.

(10) Patent No.: US 12,592,777 B2
(45) Date of Patent: Mar. 31, 2026

(54) SYSTEM AND METHOD FOR ALTERNATIVE INTERACTIONS USING OPTICAL ABSORPTION SPECTROSCOPY

(71) Applicant: Bank of America Corporation, Charlotte, NC (US)

(72) Inventors: Ngoc Tran, Charlotte, NC (US); Maneesh Kumar Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 372 days.

(21) Appl. No.: 18/480,289

(22) Filed: Oct. 3, 2023

(65) Prior Publication Data

US 2025/0112703 A1    Apr. 3, 2025

(51) Int. Cl.
*H04B 10/60* (2013.01)
*H04B 10/516* (2013.01)

(52) U.S. Cl.
CPC ........... *H04B 10/516* (2013.01); *H04B 10/60* (2013.01)

(58) Field of Classification Search
CPC .............................. H04B 10/516; H04B 10/60
See application file for complete search history.

(56) References Cited

U.S. PATENT DOCUMENTS

| | | | |
|---|---|---|---|
| 5,252,060 | A | 10/1993 | McKinnon |
| 5,317,156 | A | 5/1994 | Cooper et al. |
| 6,064,897 | A | 5/2000 | Lindberg |
| 6,943,353 | B2 | 9/2005 | Elmore |
| 7,372,573 | B2 | 5/2008 | Spartz et al. |
| 7,704,301 | B2 | 4/2010 | Zhou et al. |
| 8,063,373 | B2 | 11/2011 | Miller |
| 8,424,292 | B2 | 4/2013 | Hoyte |
| 8,730,047 | B2 | 5/2014 | Ridder |
| 9,001,335 | B2 | 4/2015 | Phillips et al. |
| 9,606,093 | B2 | 3/2017 | Alquaity et al. |
| 9,696,204 | B2 | 7/2017 | Liu et al. |
| 9,784,674 | B2 | 10/2017 | Miron |
| 10,345,235 | B2 | 7/2019 | Harb et al. |
| 10,643,008 | B2 | 5/2020 | Liu et al. |
| 10,809,164 | B2 | 10/2020 | Young |
| 12,458,260 | B1 * | 11/2025 | Deliwala ............... A61B 5/7203 |
| 2005/0200475 | A1 * | 9/2005 | Chen ........................ G08B 29/24 340/521 |
| 2006/0012797 | A1 * | 1/2006 | Chang ........................ G01J 3/02 356/484 |
| 2013/0278412 | A1 * | 10/2013 | Kelly ..................... G08B 26/00 340/539.1 |
| 2023/0184674 | A1 * | 6/2023 | Chu ........................ G08B 21/12 356/326 |
| 2024/0210315 | A1 * | 6/2024 | Berman ............. G01N 21/3504 |
| 2025/0112703 | A1 * | 4/2025 | Tran ..................... H04B 10/516 |
| 2025/0251341 | A1 * | 8/2025 | Zhang .................... A61B 34/30 |

FOREIGN PATENT DOCUMENTS

JP          2013128185  A  *  6/2013

OTHER PUBLICATIONS

J.M. Gabriagues et al.; "Performance Evaluation of a New Photonic ATM Switching Architecture based on WDM;" Nov. 1992; CiteSeerX. psu:10.1.1.51.6288.

* cited by examiner

*Primary Examiner* — Tanya T Motsinger

(57)          ABSTRACT

A mobile device performs an alternative interaction with an entity device using optical absorption spectroscopy, such as when a traditional network connection is unavailable between the mobile device and the entity device.

20 Claims, 3 Drawing Sheets

SYSTEM AND METHOD FOR ALTERNATIVE INTERACTIONS USING OPTICAL ABSORPTION SPECTROSCOPY

TECHNICAL FIELD

The present disclosure relates generally to network communications between computing devices, and more specifically to a system and method for alternative interactions using optical absorption spectroscopy.

BACKGROUND

A mobile device may utilize one or more network infrastructures to interact with other devices. The one or more network infrastructures may include, but are not limited to, a cellular network infrastructure and a Wi-Fi network infrastructure. When the one or more network infrastructures experience one or more failures or when the mobile device is beyond coverages of the one or more network infrastructures, the mobile device may not be able interact with other devices.

SUMMARY

A system that includes one or more of a mobile device, an entity device, or a gateway, as disclosed in the present disclosure, provide technical solutions to technical problems by performing alternative interactions using optical absorption spectroscopy when the mobile device does not have an ordinary network connection with the entity device. The disclosed system and methods provide several practical applications and technical advantages.

For example, the disclosed system and methods provide the practical application of alternative interactions using optical absorption spectroscopy when ordinary interactions are not possible because the mobile device does not have an ordinary network connection with the entity device through a network. Usually, a mobile device may communicate with any other device via a wireless network, including a cellular data network or a Wi-Fi network. Sometimes, the mobile device may not be able to connect to any of the existing wireless network due to being outside of effective wireless coverage or due to failures of the wireless network. In such a scenario, the mobile device may not be able to perform an interaction with an entity device.

First, the mobile device may not have a physical communication link with the entity device. Second, the mobile device may not have parameters required for the ordinary interaction due to lack of network connectivity. Such parameters may include an identity of a network service provider or an IP address of the mobile device through the network service provider. The disclosed system allows the mobile device and the entity device to perform an alternative interaction in both directions by utilizing optical absorption spectroscopy even when the mobile device does not have traditional network access. Furthermore, the interaction may be allowed even when the parameters required for an ordinary interaction are not available, by indicating that the interaction is an alternative interaction within a payload for the interaction.

In particular embodiments, a system for interactions may comprise a mobile device, an entity device, and a gateway. In particular embodiments, the mobile device may comprise a first optical modulator, a first optical demodulator, a first optical absorption spectroscopy component, and one or more first processors operably coupled to the first optical modulator, the first optical demodulator, and the first optical absorption spectroscopy component. In particular embodiments, the first optical modulator may be at least one of amplitude modulators, phase modulators, or polarization modulators. The one or more first processors may be configured to determine that the mobile device does not have a connection to the entity device through a network that provides first parameters associated with an ordinary interaction. In particular embodiments, the first parameters may comprise an identity of a network service provider or an Internet Protocol (IP) address of the mobile device. In particular embodiments, the one or more first processors may be configured to receive an authorization for an alternative interaction by a user associated with the mobile device. The one or more first processors may be configured to generate a first payload requesting an alternative interaction in response to the determination. The first payload may comprise second parameters including a flag indicating that the first payload is for the alternative interaction. In particular embodiments, the second parameters may further comprise a time of the alternative interaction or a location of the mobile device when the alternative interaction is initiated. The one or more first processors may be configured to cause the first optical modulator to encode the first payload into a first beam of light. The one or more first processors may be configured to cause the first optical absorption spectroscopy component to emit the first beam of light.

In particular embodiments, the entity device may comprise a second optical modulator, a second optical demodulator, a second optical absorption spectroscopy component, and one or more second processors operably coupled to the second optical modulator, the second optical demodulator, and the second optical absorption spectroscopy component. In particular embodiments, the second optical modulator may be at least one of amplitude modulators, phase modulators, or polarization modulators. The one or more second processors may be configured to receive the first beam of light from the mobile device through the second optical absorption spectroscopy component. The one or more second processors may be configured to cause the second optical demodulator to decode the first payload from the received first beam of light. The one or more second processors may be configured to generate a first message comprising the second parameters in the first payload and one or more third parameters. In particular embodiments, the one or more third parameters may comprise a data value associated with the alternative interaction. The one or more second processors may be configured to send the first message to a gateway requesting the alternative interaction.

In particular embodiments, the gateway may comprise one or more third processors and a memory coupled to the one or more third processors comprising instructions that when executed by the one or more third processors cause the one or more third processors to receive the first message from the entity device. In particular embodiments, an automated filtering process at the gateway may block messages that lack the first parameters. The processors may be further operable when executing the instructions to bypass the automated filtering process of the first message by determining that the first message is for the alternative interaction based on the flag in the first message. The processors may be further operable when executing the instructions to send the second message to the entity device comprising the result of the alternative interaction.

In particular embodiments, the one or more second processors may be configured to receive a second message from the gateway comprising a result of the alternative interaction. The one or more second processors may be configured to generate a second payload based on the received second message. The one or more second processors may be configured to cause the second optical modulator to encode the second payload into a second beam of light. The one or more second processors may be configured to cause the second optical absorption spectroscopy component to emit the second beam of light.

In particular embodiments, the one or more first processors may be configured to receive the second beam of light from the entity device through the first optical absorption spectroscopy component. The second beam of light may comprise the encoded second payload. The one or more first processors may be configured to cause the first optical demodulator to decode the second payload from the received second beam of light.

Thus, the disclosed system and method generally improve the technology related to network communications between computing devices. The disclosed system and method allow a mobile device to perform an interaction in an alternative manner when the mobile device does not have a conventional network connection with an entity device through a network. Furthermore, the disclosed system and method provide a way of bypassing an automated verification and/or filtering process for an alternative interaction that is performed when an ordinary interaction is not possible. The disclosed system and method provide resiliency to the system and eliminate any potential delays and network bottlenecks caused by network failures.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
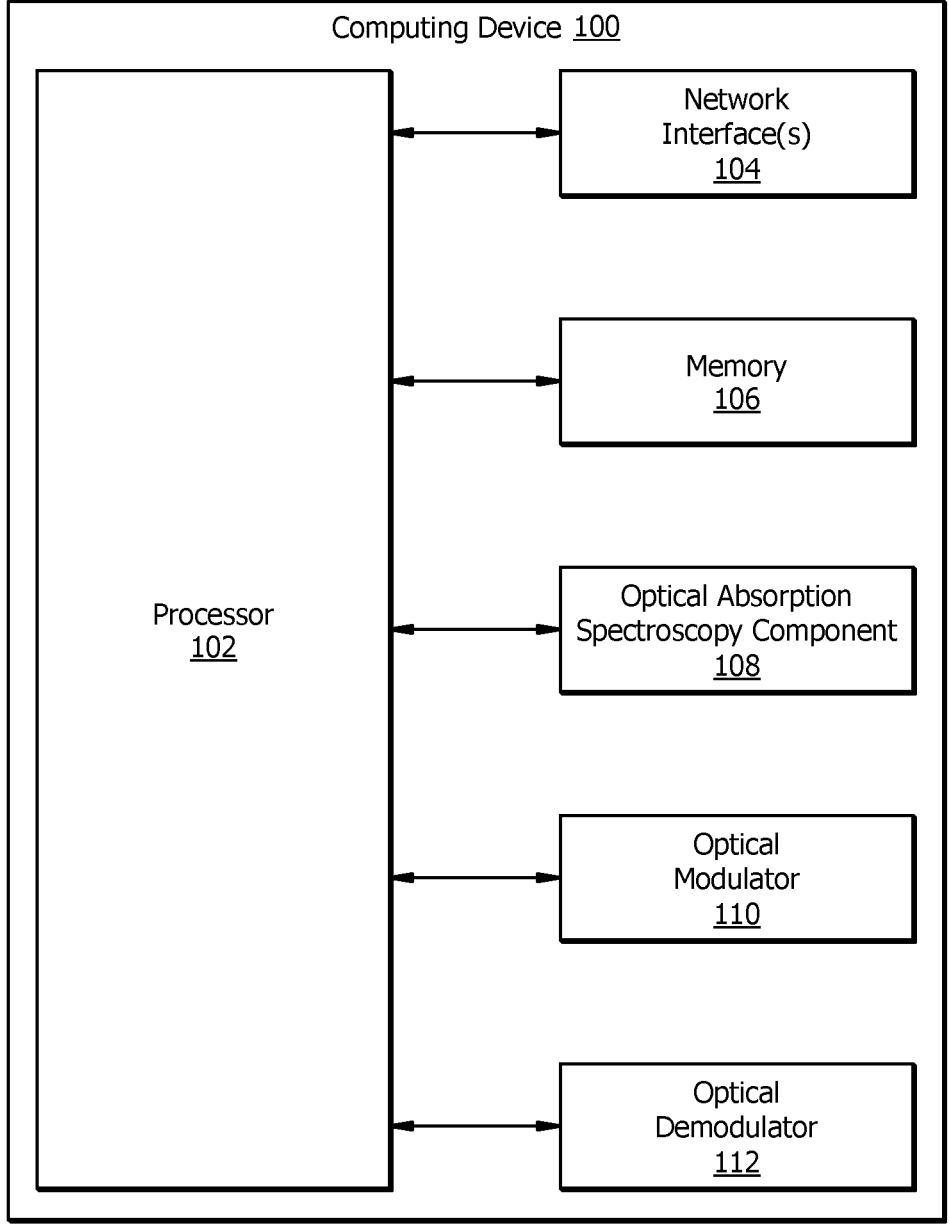
FIG. 1 is a schematic diagram of a computing device, in accordance with certain aspects of the present disclosure.
Figure 2:
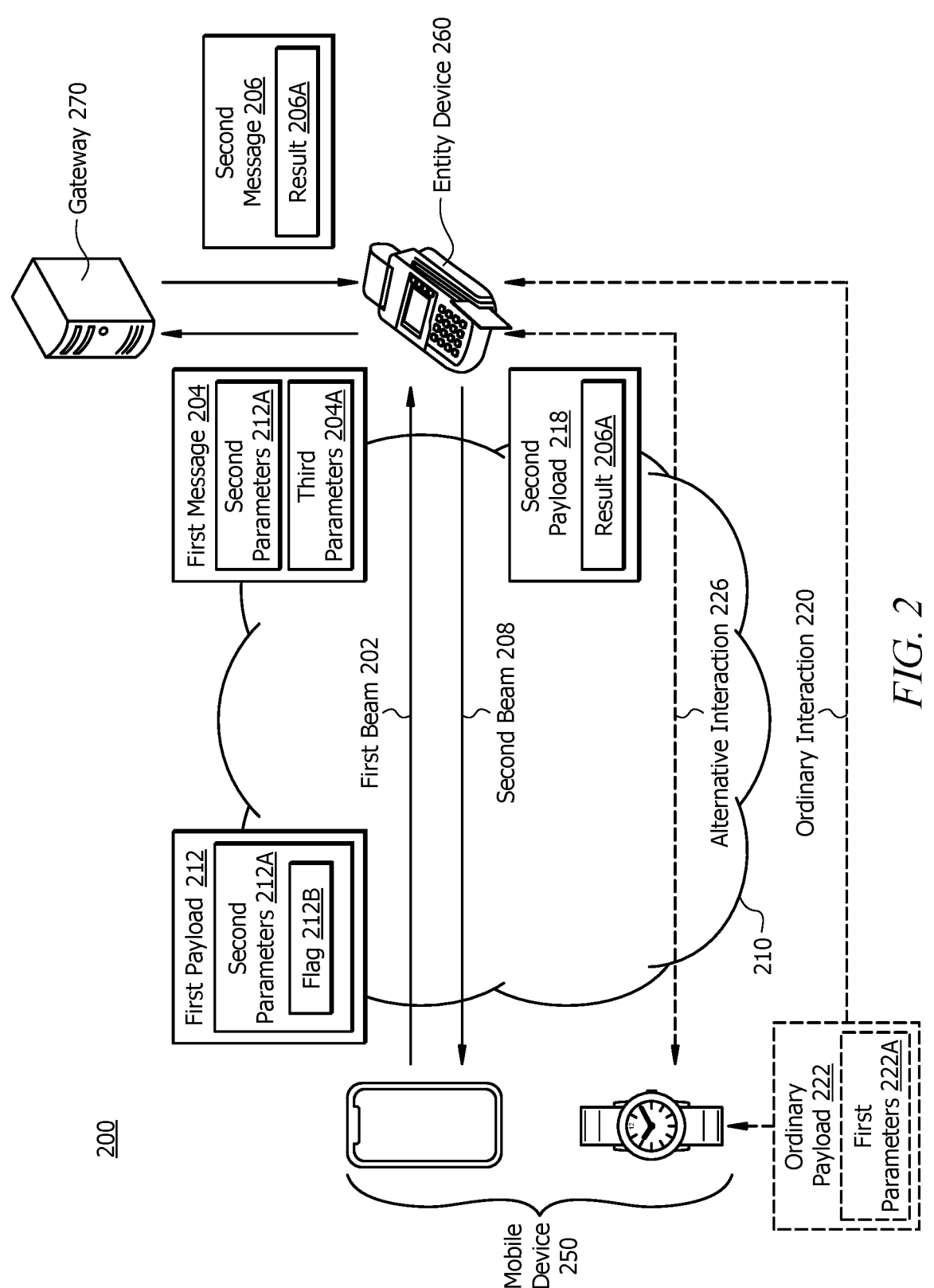
FIG. 2 is one embodiment of a system to perform alternative interactions using the computing device illustrated in FIG. 1.
Figure 3:
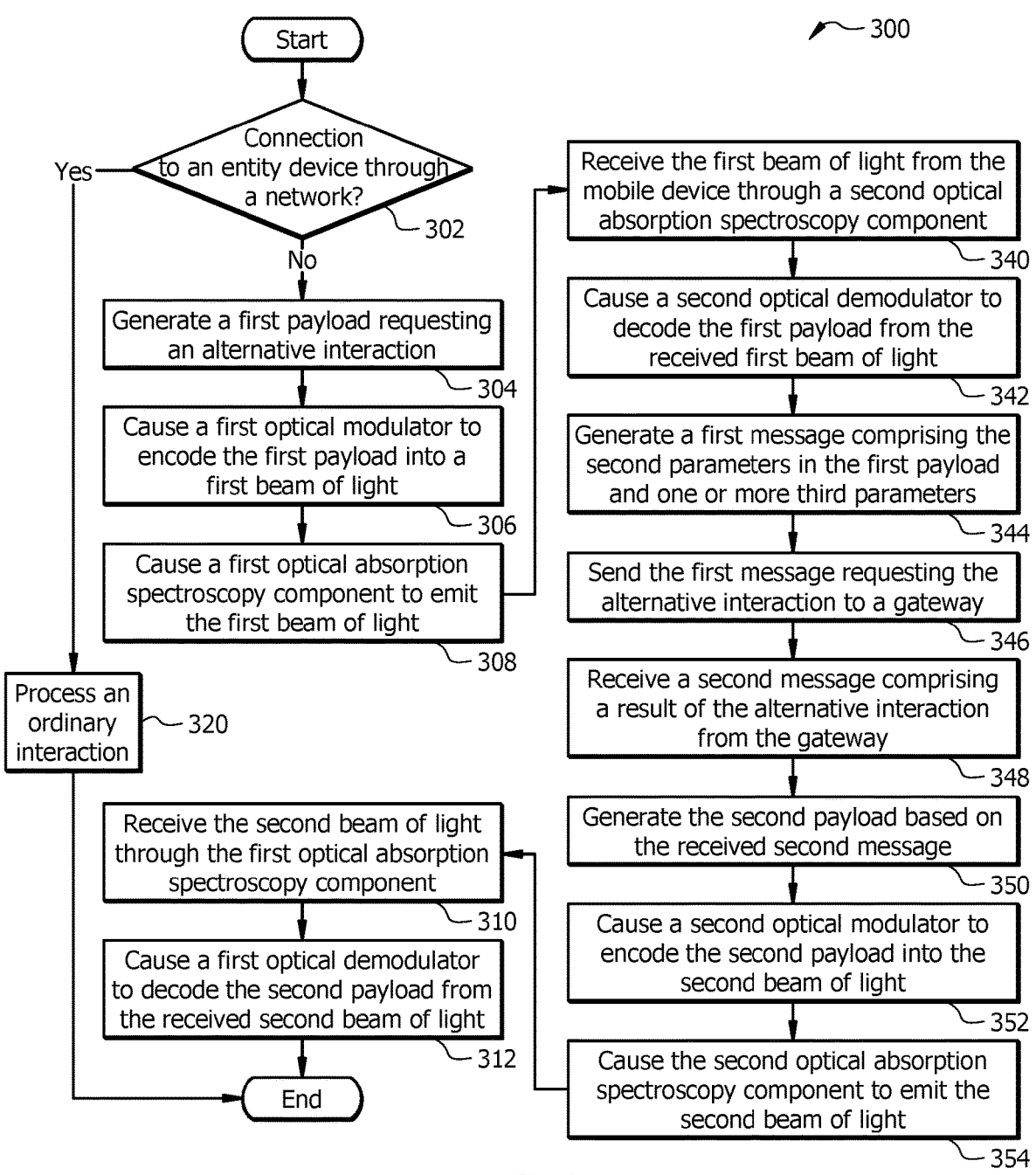
FIG. 3 illustrates a flowchart of an example method for performing alternative interactions using optical absorption spectroscopy, in accordance with one or more embodiments of the present disclosure.

As described above, no sound technical solution exists for an alternative interaction between a mobile device and an entity device when the mobile device does not have a conventional network connection with the entity device through a network that provides parameters required for an ordinary interaction. With reference to FIGS. 1-3, this disclosure presents a system and methods for alternative interactions using optical absorption spectroscopy when an ordinary interaction is not possible because the mobile device does not have a conventional network connection with the entity device.

Example Computing Device

FIG. 1 is a schematic diagram of a computing device, in accordance with certain aspects of the present disclosure. The computing device 100 may comprise a processor 102, a network interface 104, a memory 106, an optical absorption spectroscopy component 108, an optical modulator 110, and an optical demodulator 112.

The processor 102 may comprise one or more processors operably coupled to and in signal communication with the memory 106, the network interface 104, the optical absorption spectroscopy component 108, the optical modulator 110, and the optical demodulator 112. Processor 102 may be configured to receive and transmit electrical signals among one or more of the network interface 104, the memory 106, the optical absorption spectroscopy component 108, the optical modulator 110, and the optical demodulator 112. The electrical signals may be used to send and receive data and/or to control or communicate with other devices. Processor 102 may be operably coupled to one or more other devices.

The processor 102 is any electronic circuitry including, but not limited to, state machines, one or more central processing unit (CPU) components, logic units, cores (e.g., a multi-core processor), field-programmable gate array (FPGAs), application specific integrated circuits (ASICs), or digital signal processors (DSPs). The processor 102 may be a programmable logic device, a microcontroller, a microprocessor, or any suitable combination of the preceding. The one or more processors are configured to process data and may be implemented in hardware or software. For example, the processor 102 may be 8-bit, 16-bit, 32-bit, 64-bit or of any other suitable architecture. The processor 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 2 and 3. For example, the computing device 100 may be a mobile device 250 illustrated in FIG. 2. In such a case, the processor 102 may be configured to determine that the mobile device 250 does not have a connection to an entity device 260 via the network interface 104 for an ordinary interaction. The processor 102 may be configured to receive an authorization for an alternative interaction by a user associated with the mobile device 250. The processor 102 may be configured to generate a first payload requesting an alternative interaction in response to the determination. The processor 102 may be configured to cause the optical modulator 110 to encode the first payload into a first beam of light. The processor 102 may be configured to cause the optical absorption spectroscopy component 108 to emit the first beam of light. The processor 102 may be configured to receive a second beam of light from the entity device 260 through the optical absorption spectroscopy component 108. The second beam of light may comprise an encoded second payload. The processor 102 may be configured to cause the optical demodulator 112 to decode the second payload from the received second beam of light. In some embodiments, the function described herein may be implemented using logic units, FPGAs, ASICs, DSPs, or any other suitable hardware or electronic circuitry.

For another example, the computing device 100 may be the entity device 260 illustrated in FIG. 2. In such a case, the processor 102 may be configured to receive the first beam of light from the mobile device 250 through the optical absorption spectroscopy component 108. The processor 102 may be configured to cause the optical demodulator 112 to decode the first payload from the received first beam of light. The processor 102 may be configured to generate a first message comprising the first payload and one or more further parameters. The processor 102 may be configured to send the first message to a gateway 270 requesting the alternative interaction. The processor 102 may be configured to receive a second message from the gateway comprising a result of the alternative interaction. The processor 102 may be configured to generate a second payload based on the received second message. The processor 102 may be configured to cause the optical modulator 110 to encode the second payload into the second beam of light. The processor 102 may be configured to cause the optical absorption spectroscopy component 108 to emit the second beam of light. In some embodiments, the function described herein may be implemented using logic units, FPGAs, ASICs, DSPs, or any other suitable hardware or electronic circuitry.

The network interface 104 is configured to enable wired and/or wireless communications with external devices or systems via a network infrastructure. The network interface 104 is configured to communicate data between the computing device 100 and other network devices, systems, or domain(s). For example, the network interface 104 may comprise a WIFI interface, a local area network (LAN) interface, a wide area network (WAN) interface, a modem, a switch, or a router. The processor 102 may be configured to send and receive data using the network interface 104. The network interface 104 may be configured to use any suitable type of communication protocol as would be appreciated by one of ordinary skill in the art.

The memory 106 may be operable to store any of the information described with respect to FIGS. 2 and 3 along with any other data, instructions, logic, rules, or code operable to implement the function(s) described herein when executed by processor 102. For example, the memory 106 may store instructions that are executed by the processor 102. The memory 106 may comprise one or more disks, tape drives, or solid-state drives, and may be used as an over-flow data storage device, to store programs when such programs are selected for execution, and to store instructions and data that are read during program execution. The memory 106 may be operable to store, for example, instructions for performing the functions of the computing device 100 described herein, and any other data or instructions. The memory 106 may be volatile or non-volatile and may comprise read-only memory (ROM), random-access memory (RAM), ternary content-addressable memory (TCAM), dynamic random-access memory (DRAM), and static random-access memory (SRAM).

The optical absorption spectroscopy component 108 may comprise a radiation emitter, a receiver, and a charge-coupled device (CCD). The radiation emitter of the optical absorption spectroscopy component 108 may be capable of emitting radiation to a determined direction. The receiver of the optical absorption spectroscopy component 108 may capture radiation emitted by an optical absorption spectroscopy component 108 of another computing device 100. The receiver may also split the captured light into narrow wavelength bands. Finally, the light may be captured by the CCD of the optical absorption spectroscopy component 108. The optical absorption spectroscopy component 108 may measure an absorption of electromagnetic radiation, as a function of frequency or wavelength, based on samples of the absorption of electromagnetic radiation. The sample absorbs energy, i.e., photons, from the radiating field. Absorption spectroscopy is performed across the electromagnetic spectrum. Optical absorption spectroscopy may be used in chemical analysis because of its specificity and its quantitative nature. The specificity of absorption spectra allows compounds to be distinguished from one another in a mixture, making absorption spectroscopy useful in wide variety of applications. For instance, Infrared gas analyzers can be used to identify the presence of pollutants in the air, distinguishing the pollutant from nitrogen, oxygen, water, and other expected constituents. The processor 102 may be configured to transmit electrical signals to the optical absorption spectroscopy component 108 to control the optical absorption spectroscopy component 108.

The optical modulator 110 may be a device used to modulate a beam of light. The beam may be carried over free space. Depending on the parameter of a light beam which is manipulated, modulators may be categorized into amplitude modulators, phase modulators, polarization modulators, etc. Optical modulators convert information carried by an electric current in an electromagnet into light. The modulated beam of light may be emitted by the optical absorption spectroscopy component 108. The processor 102 may be configured to transmit electrical signals to the optical modulator 110 to control the optical modulator 110. The processor 102 may also be configured to transmit data to be modulated into the beam of light to the optical modulator 110.

The optical demodulator 112 may be a device used to extract an original information-bearing signal from a beam of light that is received by the optical absorption spectroscopy component 108. A demodulator is an electronic circuit that is used to recover the information content from the modulated beam of light. As many types of optical modulators are used, many types of optical demodulators exist. Optical demodulators may be categorized into amplitude demodulators, optical differential phase-shift keying (DPSK) demodulator, polarization demodulator, etc. The processor 102 may be configured to transmit electrical signals to the optical demodulator 112 to control the optical demodulator 112. The processor 102 may also be configured to receive demodulated data from the optical demodulator 112.

Alternative Interactions Using Optical Absorption Spectroscopy Components

FIG. 2 is a block diagram of an embodiment of a system 200 to perform alternative interactions 226 using instances of the computing device illustrated in FIG. 1. In particular embodiments, the mobile device 250 may be an instance of the computing device 100. In particular embodiments, the entity device 260 may also be an instance of the computing device 100. The mobile device 250 may communicate with any other device via a wireless network, including a cellular data network or a Wi-Fi network. The mobile device 250 may not be able to connect to any of the existing wireless network due to being outside of effective wireless coverage or due to failures of the wireless network. In such a scenario, the mobile device 250 may not be able to perform an ordinary interaction with the entity device 260. First, the mobile device 250 may not have a physical communication link with the entity device 260. Second, the mobile device 250 may not have parameters required for the ordinary interaction due to lack of network connectivity. In particular embodiments of the present disclosure, the mobile device 250 and the entity device 260 may perform an alternative interaction 226 in both directions by utilizing optical absorption spectroscopy even when the mobile device 250 does not have traditional network communications with entity device 260. Furthermore, the alternative interaction 226 may be allowed even when the parameters required for an ordinary interaction are not available based on an indication within a payload for the interaction indicating that the interaction is an alternative interaction 226.

In particular embodiments, a system 200 for interactions may comprise a mobile device 250, an entity device 260, and a gateway 270. In particular embodiments, the mobile device 250 may comprise a first memory 106, a first optical modulator 110, a first optical demodulator 112, a first optical absorption spectroscopy component 108, and one or more first processors 102 operably coupled to the first memory 106, the first optical modulator 110, the first optical demodulator 112, and the first optical absorption spectroscopy component 108. In particular embodiments, the first optical modulator 110 may be amplitude modulators, phase modulators, or polarization modulators. The one or more first processors 102 may be configured to determine that the mobile device 250 does not have a conventional connection to the entity device 260 through a network that provides first parameters 222A normally included in an ordinary payload 222 associated with an ordinary interaction 220. In particular embodiments, the first parameters may comprise an identity of a network service provider or an Internet Protocol (IP) address of the mobile device 250.

In particular embodiments of the present disclosure, the one or more first processors 102 may be configured to receive an authorization for an alternative interaction 226 by a user associated with the mobile device 250. The one or more first processors 102 may be configured to generate a first payload 212 requesting an alternative interaction 226 in response to the determination. The first payload 212 may comprise second parameters 212A including a flag 212B indicating that the first payload 212 is for the alternative interaction 226. In particular embodiments, the second parameters 212A may further comprise a time of the alternative interaction 226 or a location of the mobile device 250 when the alternative interaction 226 is initiated. The one or more first processors 102 may be configured to cause the first optical modulator 110 to encode the first payload 212 into a first beam of light 202. The one or more first processors 102 may be configured to cause the first optical absorption spectroscopy component 108 to emit the first beam of light 202 over free space 210.

As an example and not by way of limitation, the entity device 260 may be a point-of-sale (POS) device at a store. A user associated with the mobile device 250 may be checking out items at the store using a digital wallet stored in the mobile device 250. For the checkout, the mobile device 250 is supposed to interact with the POS device 260. The mobile device 250 may determine that the mobile device 250 does not have a conventional network connection via a traditional network infrastructure. The mobile device 250 may not have first parameters required for an ordinary checkout process with the POS device 260. The first parameters may comprise an identity of a network service provider associated with the network infrastructure or an Internet Protocol (IP) address of the mobile device 250. The mobile device 250 may present a message associated with the current situation on a display associated with the mobile device 250 and receive an authorization for an alternative checkout process from the user. The mobile device 250 may generate a first payload 212 requesting an alternative checkout process. The first payload 212 may comprise second parameters 212A including a flag 212B indicating that the first payload 212 is for an alternative checkout process. The second parameters 212A may comprise information associated with a credit card. In particular embodiments, the information associated with the credit card may be a credit card number and an expiration date. In particular embodiments, the information associated with the credit card may be a token associated with the credit card. The second parameters 212A may further comprise a time of the alternative checkout or a location of the mobile device 250 when the alternative checkout is initiated. The mobile device 250 may encode the first payload 212 into a first beam of light 202 using the first optical modulator 110. The mobile device 250 may emit the first beam of light 202 through the first optical absorption spectroscopy component 108 over free space 210.

In particular embodiments, the entity device 260 may comprise a second memory 106, a second optical modulator 110, a second optical demodulator 112, a second optical absorption spectroscopy component 108, and one or more second processors 102 operably coupled to the second memory 106, the second optical modulator 110, the second optical demodulator 112, and the second optical absorption spectroscopy component 108. In particular embodiments, the second optical modulator 110 may be amplitude modulators, phase modulators, or polarization modulators. The one or more second processors 102 may be configured to receive the first beam of light 202 from the mobile device 250 through the second optical absorption spectroscopy component 108. The one or more second processors 102 may be configured to cause the second optical demodulator 112 to decode the first payload 212 from the received first beam of light 202. The one or more second processors 102 may be configured to generate a first message 204 comprising the second parameters 212A in the first payload 212 and one or more third parameters 204A. In particular embodiments, the one or more third parameters 204A may comprise a data value associated with the alternative interaction 226. The one or more second processors 102 may be configured to send the first message 204 requesting the alternative interaction 226 to a gateway 270.

As an example and not by way of limitation, continuing with the prior example, the POS device 260 may receive the first beam of light 202 from the mobile device 250 through the optical absorption spectroscopy component 108 associated with the POS device 260. The POS device may decode the first payload 212 from the received first beam of light 202 using the optical demodulator 112 associated with the POS device 260. The POS device 260 may generate the first message 204 comprising the second parameters 212A in the first payload 212 and one or more third parameters 204A. In particular embodiments, the one or more third parameters 204A may comprise a price associated with the checkout. The POS device 260 may send the first message 204 to the gateway 270, which will route the first message 204 to an issuer associated with the credit card.

In particular embodiments, the gateway 270 may comprise one or more third processors and a memory coupled to the one or more third processors comprising instructions that when executed by the one or more third processors cause the one or more third processors to receive the first message 204 from the entity device 260. In particular embodiments, an automated filtering process at the gateway 270 may block messages that lack the first parameters. The processors may be further operable when executing the instructions to bypass the automated filtering process of the first message 204 by determining that the first message is for the alternative interaction 226 based on the flag 212B in the first message 204. The processors may be further operable when executing the instructions to send the second message 206 comprising the result 206A of the alternative interaction 226 to the entity device 260.

As an example and not by way of limitation, continuing with the prior example, the gateway 270 may receive the first message 204 from the POS device 260. An automated filtering process at the gateway 270 may examine the content of messages before the gateway 270 forwards the messages to issuer systems. The automated filtering process at the gateway 270 may filter out a message for an ordinary checkout when the message does not have an identifier of a network service provider or an IP address of the mobile device 250. However, the automated filtering process at the gateway 270 may be bypassed for the first message 204 because the first message 204 comprises a flag 212B indicating that the first message 204 is for an alternative checkout process. The gateway 270 may forward the first message 204 to the issuer associated with the credit card. The gateway 270 may receive a result of the alternative checkout from the issuer associated with the credit card. The gateway 270 may generate a second message 206 based on the received result of the alternative checkout. The gateway 270 may send the second message 206 to the POS device 260.

In particular embodiments, the one or more second processors 102 of the entity device 260 may be configured to receive the second message 206 comprising a result 206A of the alternative interaction 226 from the gateway 270. The one or more second processors 102 may be configured to generate a second payload 218 based on the received second message 206. The second payload 218 may comprise the result 206A of the alternative interaction 226 in the second message 206. The one or more second processors 102 may be configured to cause the second optical modulator 110 to encode the second payload 218 into a second beam of light 208. The one or more second processors 102 may be configured to cause the second optical absorption spectroscopy component 108 to emit the second beam of light 208 over free space 210.

As an example and not by way of limitation, continuing with the prior example, the POS device 260 may receive the second message 206 comprising the result 206A of the alternative checkout from the gateway 270. The POS device 260 may generate a second payload 218 based on the received second message 206. The POS device 260 may encode the second payload 218 into a second beam of light 208 using the optical modulator 110 associated with the POS device 260. The POS device 260 may emit the second beam of light 208 through the optical absorption spectroscopy component 108 associated with the POS device 260 over free space 210.

In particular embodiments, the one or more first processors 102 associated with the mobile device 250 may be configured to receive the second beam of light 208 from the entity device 260 through the first optical absorption spectroscopy component 108. The second beam of light 208 may comprise the encoded second payload 218. The one or more first processors 102 may be configured to cause the first optical demodulator 112 to decode the second payload 218 from the received second beam of light 208. The one or more first processors 102 may be configured to present the result of the alternative checkout in the second payload 218 on the display associated with the mobile device 250.

Example Method

FIG. 3 illustrates a flowchart of an example method 300 for performing alternative interactions using optical absorption spectroscopy, in accordance with one or more embodiments of the present disclosure. Method 300 may be performed by the mobile device 250 and entity device 260 shown in FIG. 2. The mobile device 250 may comprise a first memory 106, a first optical modulator 110, a first optical demodulator 112, a first optical absorption spectroscopy component 108, and one or more first processors 102 operably coupled to the first memory 106, the first optical modulator 110, the first optical demodulator 112, and the first optical absorption spectroscopy component 108. The entity device 260 may comprise a second memory 106, a second optical modulator 110, a second optical demodulator 112, a second optical absorption spectroscopy component 108, and one or more second processors 102 operably coupled to the second memory 106, the second optical modulator 110, the second optical demodulator 112, and the second optical absorption spectroscopy component 108.

At operation 302, the mobile device 250 may determine whether the mobile device 250 has a connection to the entity device 260 through a network that provides first parameters associated with an ordinary interaction. When the mobile device determines that the mobile device 250 has a connection to the entity device 260 through a network that provides first parameters associated with an ordinary interaction, the method proceeds to operation 320, where the mobile device 250 may process an ordinary interaction with the entity device 260. When the mobile device determines that the mobile device 250 does not have a connection to the entity device 260 through a network that provides first parameters associated with an ordinary interaction, the method proceeds to operation 304, where the mobile device 250 may generate a first payload requesting an alternative interaction comprising second parameters. The second parameters may comprise a flag indicating that the first payload is for the alternative interaction. At operation 306, the mobile device 250 may cause the first optical modulator to encode the first payload into a first beam of light. At operation 308, The mobile device 250 may cause the first optical absorption spectroscopy component to emit the first beam of light.

The method may proceed to operation 340, where the entity device 260 may receive the first beam of light from the mobile device 250 through the second optical absorption spectroscopy component. At operation 342, the entity device 260 may cause the second optical demodulator to decode the first payload from the received first beam of light. At operation 344, the entity device 260 may generate a first message comprising the second parameters in the first payload and one or more third parameters. At operation 346, the entity device 260 may send the first message requesting the alternative interaction to a gateway. At operation 348, the entity device 260 may receive a second message comprising a result of the alternative interaction from the gateway. At operation 350, the entity device 260 may generate the second payload based on the received second message. At operation 352, the entity device 260 may cause the second optical modulator to encode the second payload into the second beam of light. At operation 354, the entity device 260 may cause the second optical absorption spectroscopy component to emit the second beam of light.

The method may proceed to operation 310, where the mobile device 250 may receive a second beam of light from the entity device 260 through the first optical absorption spectroscopy component. The second beam of light may comprise an encoded second payload. At operation 312, the mobile device 250 may cause the first optical demodulator to decode the second payload from the received second beam of light.

The invention claimed is:

1. A system, comprising:
a mobile device; and
an entity device;
wherein the mobile device comprises:
    a first optical modulator;
    a first optical demodulator;
    a first optical absorption spectroscopy component; and
    one or more first processors operably coupled to the first optical modulator, the first optical demodulator, and the first optical absorption spectroscopy component, the one or more first processors configured to:
        determine that the mobile device does not have a connection to the entity device through a network that provides first parameters associated with an ordinary interaction;
        generate, in response to the determination, a first payload requesting an alternative interaction comprising second parameters, wherein the second parameters comprise a flag indicating that the first payload is for the alternative interaction;
        cause the first optical modulator to encode the first payload into a first beam of light;
        cause the first optical absorption spectroscopy component to emit the first beam of light;
        receive, through the first optical absorption spectroscopy component, a second beam of light from the entity device, wherein the second beam of light comprises an encoded second payload; and
        cause the first optical demodulator to decode the second payload from the received second beam of light; and
wherein the entity device comprises:
    a second optical modulator;
    a second optical demodulator;
    a second optical absorption spectroscopy component; and
    one or more second processors operably coupled to the second optical modulator, the second optical demodulator, and the second optical absorption spectroscopy component, the one or more second processors configured to:
        receive, through the second optical absorption spectroscopy component, the first beam of light from the mobile device;
        cause the second optical demodulator to decode the first payload from the received first beam of light;
        generate a first message comprising the second parameters in the first payload and one or more third parameters;
        send, to a gateway, the first message requesting the alternative interaction;
        receive, from the gateway, a second message comprising a result of the alternative interaction;
        generate the second payload based on the received second message;
        cause the second optical modulator to encode the second payload into the second beam of light; and
        cause the second optical absorption spectroscopy component to emit the second beam of light.

2. The system of claim 1, wherein the first parameters comprise an identity of a network service provider or an Internet Protocol (IP) address of the mobile device.

3. The system of claim 1, wherein the second parameters comprise a time of the alternative interaction.

4. The system of claim 1, wherein the one or more third parameters comprise a data value associated with the alternative interaction.

5. The system of claim 1, wherein the gateway bypasses an automated filtering process of the first message based on the flag, and wherein the automated filtering process blocks messages that lack the first parameters.

6. The system of claim 1, wherein the first optical modulator and the second optical modulator are at least one of amplitude modulators, phase modulators, or polarization modulators.

7. The system of claim 1, wherein the alternative interaction is authorized by a user associated with the mobile device.

8. A method, comprising:
determining, by a mobile device comprising a first optical modulator, a first optical demodulator, a first optical absorption spectroscopy component, and one or more first processors operably coupled to the first optical modulator, the first optical demodulator, and the first optical absorption spectroscopy component, that the mobile device does not have a connection to an entity device through a network that provides first parameters associated with an ordinary interaction;
generating, by the mobile device, in response to the determination, a first payload requesting an alternative interaction comprising second parameters, wherein the second parameters comprise a flag indicating that the first payload is for the alternative interaction;
causing, by the mobile device, the first optical modulator to encode the first payload into a first beam of light;
causing, by the mobile device, the first optical absorption spectroscopy component to emit the first beam of light;
receiving, by the entity device comprising a second optical modulator, a second optical demodulator, a second optical absorption spectroscopy component, and one or more second processors operably coupled to the second optical modulator, the second optical demodulator, and the second optical absorption spectroscopy component, through the second optical absorption spectroscopy component, the first beam of light from the mobile device;
causing, by the entity device, the second optical demodulator to decode the first payload from the received first beam of light;
generating, by the entity device, a first message comprising the second parameters in the first payload and one or more third parameters;
sending, by the entity device, to a gateway, the first message requesting the alternative interaction;
receiving, by the entity device, from the gateway, a second message comprising a result of the alternative interaction;
generating, by the entity device, the second payload based on the received second message;
causing, by the entity device, the second optical modulator to encode the second payload into a second beam of light;
causing, by the entity device, the second optical absorption spectroscopy component to emit the second beam of light;
receiving, by the mobile device, through the first optical absorption spectroscopy component, the second beam of light from the entity device, wherein the second beam of light comprises an encoded second payload; and

causing, by the mobile device, the first optical demodulator to decode the second payload from the received second beam of light.

9. The method of claim 8, wherein the first parameters comprise an identity of a network service provider or an IP address of the mobile device.

10. The method of claim 8, wherein the second parameters comprise a time of the alternative interaction.

11. The method of claim 8, wherein the one or more third parameters comprise a data value associated with the alternative interaction.

12. The method of claim 8, wherein the gateway bypasses an automated filtering process of the first message based on the flag, and wherein the automated filtering process blocks messages that lack the first parameters.

13. The method of claim 8, wherein the first optical modulator and the second optical modulator are at least one of amplitude modulators, phase modulators, or polarization modulators.

14. The method of claim 8, wherein the alternative interaction is authorized by a user associated with the mobile device.

15. A system, comprising:
a mobile device;
an entity device; and
a gateway;
wherein the mobile device comprises:
a first optical modulator;
a first optical demodulator;
a first optical absorption spectroscopy component; and
one or more first processors operably coupled to the first optical modulator, the first optical demodulator, and the first optical absorption spectroscopy component, the one or more first processors configured to:
determine that the mobile device does not have a connection to the entity device through a network that provides first parameters associated with an ordinary interaction;
generate, in response to the determination, a first payload requesting an alternative interaction comprising second parameters, wherein the second parameters comprise a flag indicating that the first payload is for the alternative interaction;
cause the first optical modulator to encode the first payload into a first beam of light;
cause the first optical absorption spectroscopy component to emit the first beam of light;
receive, through the first optical absorption spectroscopy component, a second beam of light from the entity device, wherein the second beam of light comprises an encoded second payload; and
cause the first optical demodulator to decode the second payload from the received second beam of light;
wherein the entity device comprises:
a second optical modulator;

a second optical demodulator;
a second optical absorption spectroscopy component; and
one or more second processors operably coupled to the second optical modulator, the second optical demodulator, and the second optical absorption spectroscopy component, the one or more second processors configured to:
receive, through the second optical absorption spectroscopy component, the first beam of light from the mobile device;
cause the second optical demodulator to decode the first payload from the received first beam of light;
generate a first message comprising the second parameters in the first payload and one or more third parameters;
send, to a gateway, the first message requesting the alternative interaction;
receive, from the gateway, a second message comprising a result of the alternative interaction;
generate the second payload based on the received second message;
cause the second optical modulator to encode the second payload into the second beam of light; and
cause the second optical absorption spectroscopy component to emit the second beam of light; and
wherein the gateway comprises:
one or more third processors; and
a memory coupled to the one or more third processors comprising instructions that when executed by the one or more third processors cause the one or more third processors to:
receive, from the entity device, the first message;
bypass an automated filtering process of the first message by determining that the first message is for the alternative interaction based on the flag in the first message; and
send, to the entity device, the second message comprising the result of the alternative interaction.

16. The system of claim 15, wherein the first parameters comprise an identity of a network service provider or an Internet Protocol (IP) address of the mobile device.

17. The system of claim 15, wherein the second parameters comprise a time of the alternative interaction.

18. The system of claim 15, wherein the one or more third parameters comprise a data value associated with the alternative interaction.

19. The system of claim 15, wherein the automated filtering process blocks messages that lack the first parameters.

20. The system of claim 15, wherein the first optical modulator and the second optical modulator are at least one of amplitude modulators, phase modulators, or polarization modulators.

* * * * *